United States Patent
Kristiansen et al.

(10) Patent No.: US 6,772,268 B1
(45) Date of Patent: Aug. 3, 2004

(54) CENTRALIZED LOOK UP ENGINE ARCHITECTURE AND INTERFACE

(75) Inventors: Adrian Kristiansen, Somerville, MA (US); Richard P. Modelski, Hollis, NH (US)

(73) Assignee: Nortel Networks Ltd (CA)

( * ) Notice: Subject to any disclaimer, the term of this patent is extended or adjusted under 35 U.S.C. 154(b) by 465 days.

(21) Appl. No.: 09/741,852

(22) Filed: Dec. 22, 2000

(51) Int. Cl.[7] .................... G06F 13/36; G06F 13/00; G06F 12/00
(52) U.S. Cl. .................... 710/308; 710/316; 711/147; 711/148
(58) Field of Search ................ 710/22–28, 308, 710/316, 317; 711/147, 148; 714/9; 709/212–214, 216

(56) References Cited

U.S. PATENT DOCUMENTS

| | | | | |
|---|---|---|---|---|
| 5,546,562 A | * | 8/1996 | Patel | 703/14 |
| 5,577,204 A | * | 11/1996 | Brewer et al. | 710/317 |
| 5,761,455 A | * | 6/1998 | King et al. | 710/316 |
| 5,805,917 A | * | 9/1998 | Sakurada et al. | 712/4 |
| 5,878,240 A | * | 3/1999 | Tomko | 710/316 |
| 6,085,276 A | * | 7/2000 | VanDoren et al. | 700/5 |
| 6,088,771 A | * | 7/2000 | Steely et al. | 711/154 |
| 6,101,420 A | * | 8/2000 | VanDoren et al. | 700/5 |
| 6,125,429 A | * | 9/2000 | Goodwin et al. | 711/143 |
| 6,393,530 B1 | * | 5/2002 | Greim et al. | 711/147 |
| 6,598,130 B2 | * | 7/2003 | Harris et al. | 711/147 |
| 2002/0087807 A1 | * | 7/2002 | Gharachorloo et al. | 711/141 |

* cited by examiner

Primary Examiner—Sumati Lefkowitz
Assistant Examiner—Trisha Vu
(74) Attorney, Agent, or Firm—Steubing McGuinness & Manaras LLP (57) ABSTRACT

A memory access processor and memory access interface for transferring data information to and from a plurality of SSRAM locations. The processor has a lookup controller for identifying a data request and locating the data requested from the SSRAM locations. The bus allows a data request and retrieval throughput from a routing processor to the memory access processor at a maximum rate, about 10 gigabits per second without substantial pipeline stalls or overflows.

10 Claims, 7 Drawing Sheets

CENTRALIZED LOOK UP ENGINE ARCHITECTURE AND INTERFACE

BACKGROUND OF THE INVENTION

1. Field of the Invention

The present invention relates to external memory processor and interface providing high speed memory access for a switching router system. More particularly, the external memory processor and interface performs high speed memory lookups for one or more switching router processors.

3. Description of Related Art and General Background

The unprecedented growth of data networks (e.g., corporate-wide Intranets, the Internet, etc.) as well as the development of network applications (e.g., multimedia, interactive applications, proprietary corporate applications, etc.) have resulted in creating a demand for higher network bandwidth capabilities and better network performance. Moreover, such demands are exacerbated by the advent of policy-based networking, which requires more data packet processing, thereby increasing the amount of work per packet and occupying processing resources. One approach to increase network bandwidth and improving network performance is to provide for higher forwarding and/or routing performance within the network.

Some improvements in routing performance are directed to enhancing processor throughput. Processor designers have been able to obtain throughput improvements by greater integration, by reducing the size of the circuits, and by the use of single-chip reduced instruction set computing (RISC) processors, which are characterized by a small simplified set of frequently used instructions for rapid execution. It is commonly understood, however, that physical size reductions cannot continue indefinitely and there are limits to continually increasing processor clock speeds.

Further enhancements in processor throughput include modifications to the processor hardware to increase the average number of operations executed per clock cycle. Such modifications, may include, for example instruction pipelining, the use of cache memories, and multi-thread processing. Pipeline instruction execution allows subsequent instructions to begin executing before previously issued instructions have finished. Cache memories store frequently used and other data nearer the processor and allow instruction execution to continue, in most cases, without waiting the full access time of a main memory. Multi-thread processing divides a processing task into independently executable sequences of instructions called threads and the processor, recognizing when an instruction has caused it to be idle (i.e., first thread), switches from the instruction causing the memory latency to another instruction (i.e., second thread) independent from the former instruction. At some point, the threads that had caused the processor to be idle will be ready and the processor will return to those threads. By switching from one thread to the next, the processor can minimize the amount of time that it is idle.

In addition to enhancing processor throughput, improvements in routing performance may be achieved by partitioning the routing process into two processing classes: fast path processing and slow path processing. Partitioning the routing process into these two classes allows for network routing decisions to be based on the characteristics of each process. Routing protocols, such as, Open Shortest Path First (OSPF) and Border Gateway Protocol (BGP), have different requirements than the fast-forwarding Internet Protocol (FFIP). For example, routing protocols, such as OSPF and BGP, typically operate in the background and do not operate on individual data packets, while FFIP requires IP destination address resolution, checksum verification and modification, etc. on an individual packet basis.

The IP fast forwarding problem is becoming harder as the amount of time allotted for processing on a per packet basis steadily decreases in response to increasing media transmission speeds. In an effort to alleviate this problem, many router and Layer-3 switch mechanisms distribute the fast path processing to every port in their chassis, so that fast path processing power grows at a single port rate and not at the aggregate rate of all ports in the box. It is clear that most of current solutions will run out of steam, as the faster media become the mainstream.

As processing speeds continue to increase, a burden is placed on memory space allocation, memory access speeds, as well as software maintenance for the memory access by the processor. A technique to provide more lookup performance is to pipeline the memory accesses of the operation briefly explained above. Each lookup pipeline stage has a dedicated portion of the search memory allocated to it, usually selected on SSRAM component boundaries. The base of the next array is an address into the next memory allocated to the next lookup pipeline. The first stage takes the first radix-4 nibble performs its lookup and either has a result, a miss or an address for the next stage. Subsequently each stage performs in this manner until a result is found or the key is exhausted causing an exception. For a 24-bit key, a radix-4 search engine can be designed using a 36-bit memory that provides up to 200 million lookups per second. To achieve this performance, at least eight memory components, each having its own address and data bus, are needed.

SUMMARY OF THE INVENTION

The present invention provides fast data processing chip to memory chip exchange, in a route switch mechanism having a plurality of data processors. The data processing and exchange approximates a ten gigabits per second transfer rate. A memory access processor and memory access interface for transferring data information to and from a plurality of SSRAM locations. The processor has a lookup controller for identifying a data request and locating the data requested from the SSRAM locations. The bus allows a data request and retrieval throughput from a routing processor to the memory access processor at a maximum rate, about 10 gigabits per second without substantial pipeline stalls or overflows.

BRIEF DESCRIPTION OF THE DRAWINGS

The above and other objects, features and advantages of the present invention are further described in the detailed description which follows, with reference to the drawings by way of non-limiting exemplary embodiments of the invention, wherein like reference numerals represent similar parts of the present invention throughout the several views and wherein.

DETAILED DESCRIPTION OF THE EMBODIMENTS

A switching router processor for transferring data packets at a rate that about 10 gigabits per second typically has an internal memory device and possibly a second external memory device. These memory devices are peculiar to the specific processor. Such that in a system using several switching router processors, either in parallel or in pipeline, each processor only has access to the allocated memory devices. Any information of one processor needed by another processor has to be requested through the host system. Such requests tend to slow the fast path processing down because of the constant swapping of data in and out of memory locations. By providing an additional memory look up processor that is accessible by each one of the several switching router processors in the system, the stored data is requested and accessed in a rapid manner, thereby enhancing the ability of the system to process data at a rate of about 10 gigabits per second.

Figure 1:
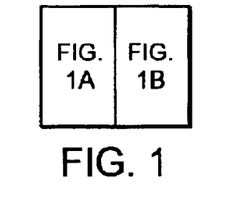
FIGS. 1A and 1B are a block schematic diagram of the memory look up processor of the present invention.
Figure 1A:
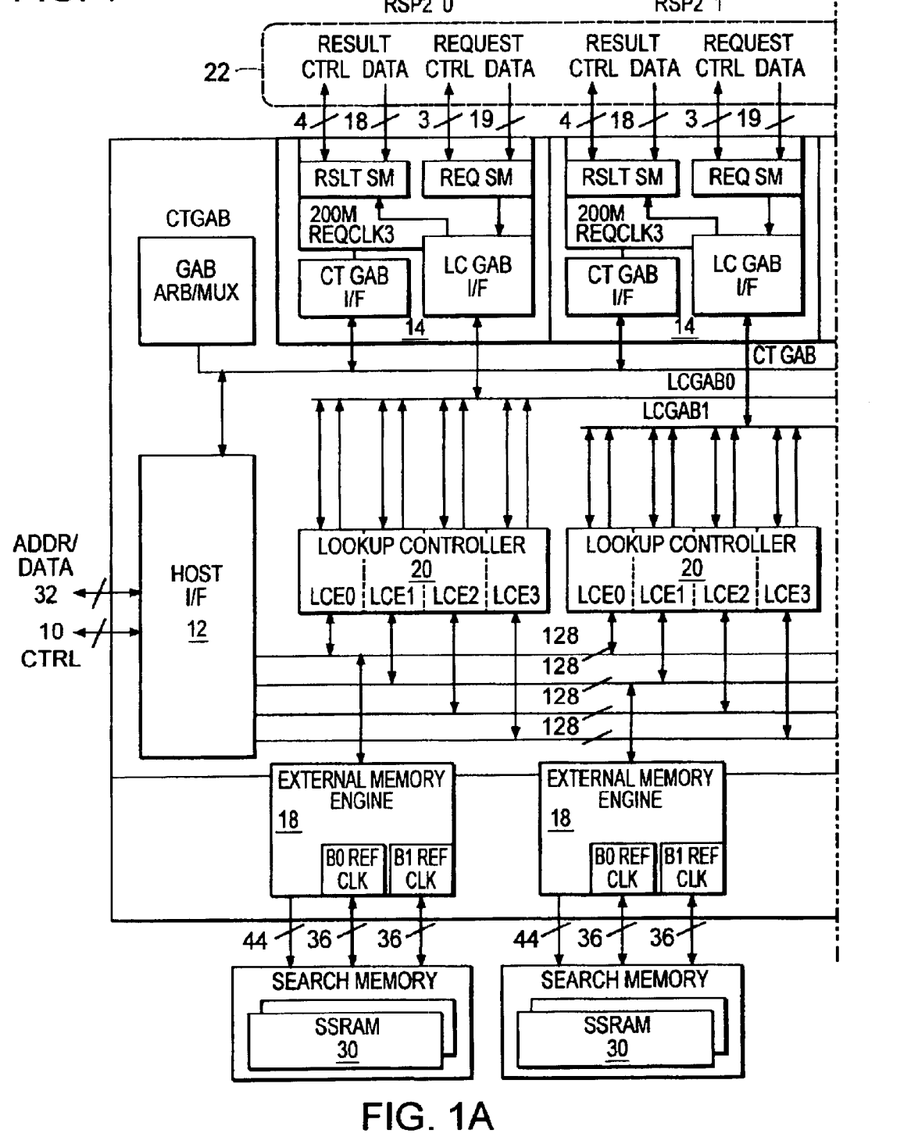
Figure 1B:
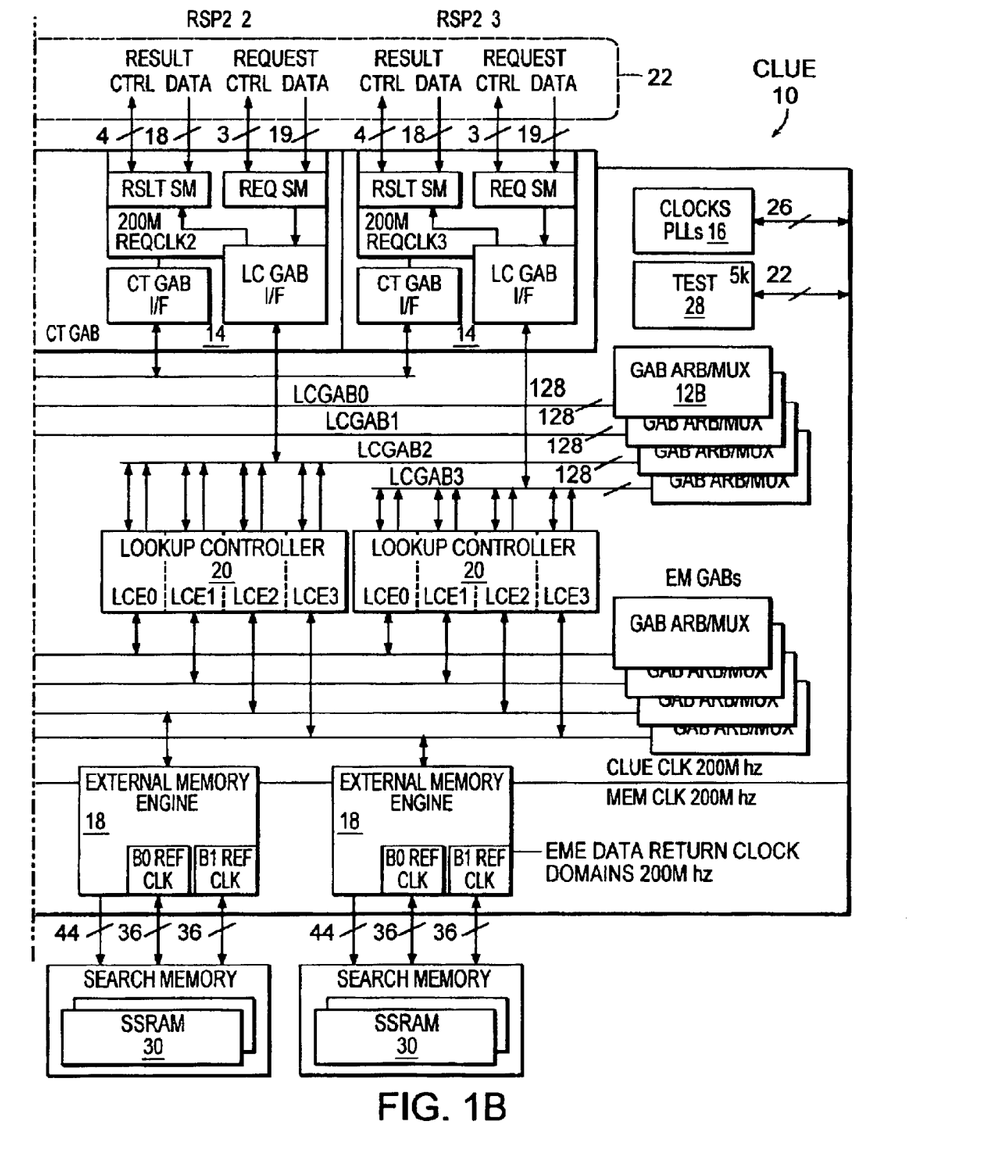

Referring now to the drawings in greater detail, FIGS. 1A and 1B are a block schematic diagram of the memory look up processor. The memory look up processor is an ASIC processor referred to as a centralized look up engine (CLUE). The CLUE processor 10 is coupled in the host system by a host interface 12. The host interface 12 receives control signals and address/data signals. These signals are placed in the CLUE global registers for controlling the operation of the CLUE 10 by a host system. In addition to the global registers, the host interface also is coupled to a plurality of global access bus arbitrating multiplexers 12B that use the contents of the global registers for directing the data flow through the CLUE processor 10.

A plurality of high speed access bus interfaces 22 allow the CLUE to transfer data to and from several switching router processors. The switching processors submit data request to the CLUE processor 10 via a plurality of lookup request FIFO buffers 14. Each one of the buffers 14 corresponds to a switching processor. The buffers 14 transfer the requests or switching router processors, sequentially to a look up controller 20. The look up controller 20 performs the memory reading operations by establishing where the data is stored, retrieving the stored data and then returning a data result to the requesting switching router processor.

The look up controller 20 receives memory search instructions from the global access bus arbitrating multiplexers 12B. The global access bus arbitrating multiplexers 12B provides the look up controller 20 rights to access and search the memory modules 30 via the plurality of external memory engines 18. The external memory engines 18 are pipeline memory interfaces to the memory modules 30. By sequentially searching the multiplicity of memory modules through the external memory engines 18, the look up controller 20 can process the data in and out of memory at a greater rate than each of the switching processors requesting the host to request form each of the other switching processors.

The CLUE 10 is synchronized to the clock of the host system, along with the other switching processors. The clocks and phased locked loops 16 are used to maintain that CLUE functions at a frequency on the order 200 MHz, thereby providing the read/write of the CLUE to the memory modules to run concurrently with the request and response of the switching processors to the CLUE 10.

Figure 2:
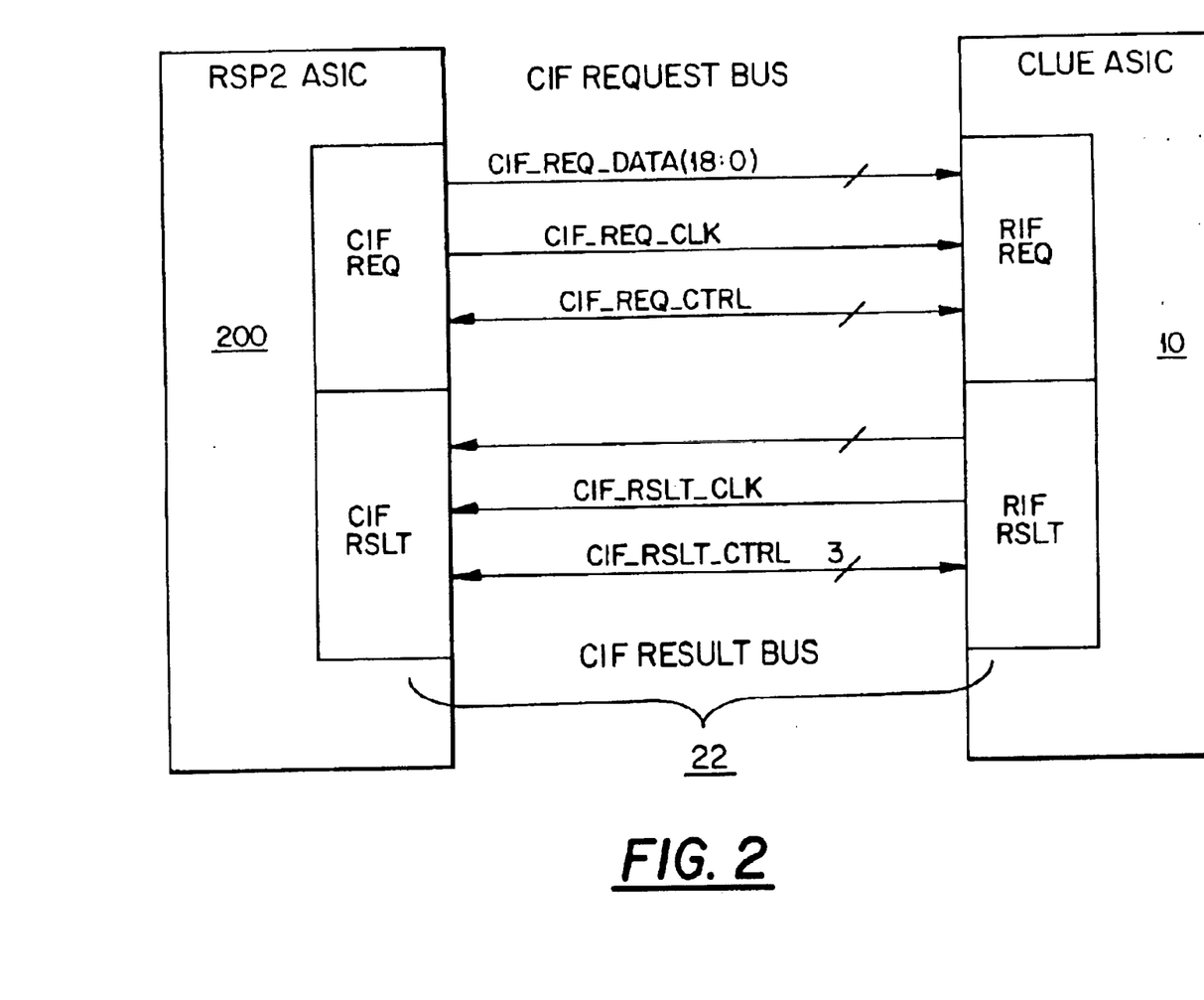
FIG. 2 is a block diagram of the memory look up processor interface bus.
Figure 3:
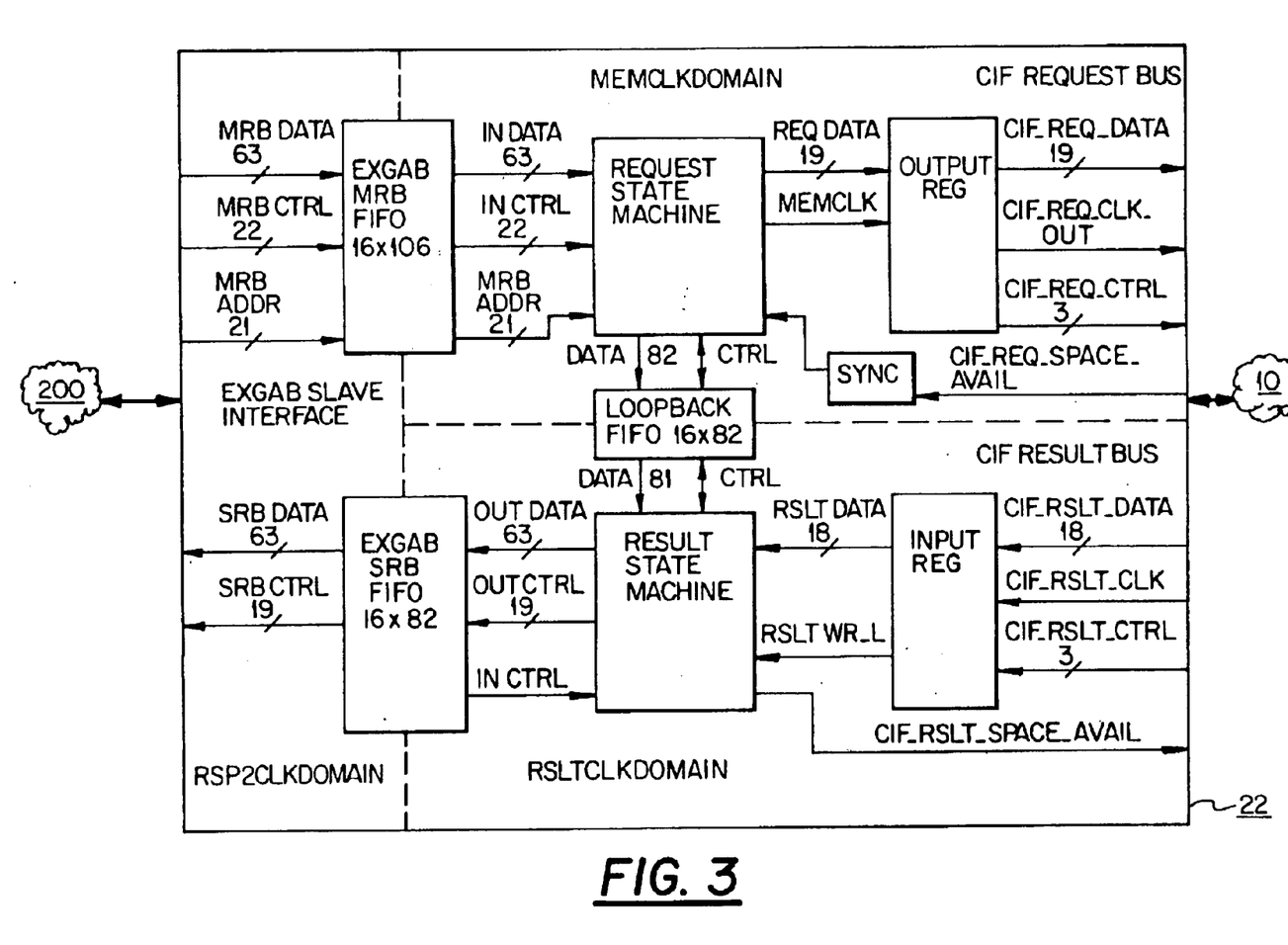
FIG. 3 is a more detailed block diagram of the memory look up processor interface bus.
Figure 4:
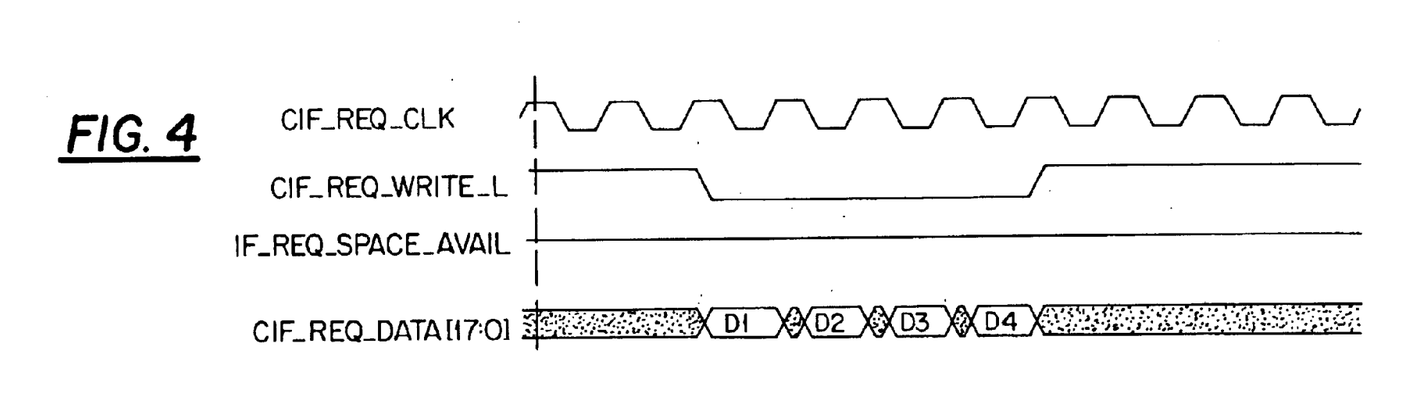
FIGS. 4 and 5 are timing signal diagrams for the data requests and data results across the of the memory look up processor interface bus.

In order to provide the high speed access of the switching processors to the CLUE 10, a special bus and interface infrastructure 22 communicates each one of the switching processors to the CLUE 10. FIGS. 2 and 3 provide the basic illustration of the CLUE bus and interface infrastructure (CIF) 22. The CLUE 10, CIF 22 and one of the switching processors 200 form the basic function of the CLUE 10 and the CIF 22. The CIF 22 is a shared resource that provides an interface to the CLUE 10 for centralized memory lookups. CIF 22 is capable of supporting 50 million 24-bit radix-4 lookups into a 32 Mbyte memory interfaced to the CLUE 10 that can be shared with several other multi-thread packet switching processors 200.

The interface between the switching processor 200 and the CLUE 10 is called the CLUE Interface (CIF). This interface transports a global access bus 12B operation between the two ASICs. It takes a full width global access bus 12B operation and transports it in several cycles across the narrowed CIF bus. The narrowed bus is implemented to reduce the pin count of the ASICs. The CIF 22 performs the task of converting operations between the EXGAB 40 and the CIF 22. In operation, a minimum number of clock cycles optimize the bandwidth of the CIF 22. Similarly, the implementation uses a request data path and a result data path. An operation request to the CLUE 10 requires the following information from a switching processor 200 to be transferred over CIF 22.

The request state machine 50 remains in idle while waiting for a request operation to be ready at the EXGAB 40 and for a space-available indication from the CLUE 10 request FIFO. In addition, there must be space available in the loopback 55 in case the operation is a loopback or a bus error, which requires the operation to be looped back to the EXGAB 40 via the loopback 55. When these conditions are met, the request state machine 50 initiates a read and interprets the incoming information. The request state machine 50 evaluates the operation type and determines the number of cycles required to transport the operation across the CIF 22 request bus. The operation is transported across the data[16:0] bus and the appropriate control fields are set on data[18:17]. The control fields identify the Start Of Transfer, the Address Transfer, the Data Transfer, and the End of Transfer. The loopback operation and any bus error conditions result in data being returned to the EXGAB 40 master via the loopback 55 and are not transported across the external CIF 22 request bus. A "NoOperation" type results in the operation being dropped. This request state machine 50 runs off the domain in the switching processor 200. In addition, the CLUE 10 provides a notification to the request state machine 50 that a look up buffer 16 has available space by the cif_req_space_avail signal, fed through a synchronizer 65.

The configuration register for the CIF 22 that resides in the request state machine 50. This register is identified on a global access bus 12B request by a unique sub-device ID. The valid operations for this register are a register read and a register write. All other operations to this sub-device will return a bus error to the requesting device. The configuration bits that are used by the result state machine are dual rank synchronized in the switching processor 200. The register-write command returns a write acknowledge to the requesting device. The request state machine writing a write-acknowledge operation to the loopback 55 accomplishes this. Similarly, a read register command results in a read return operation being loaded into the loopback 55.

The request state machine 50 reads the EXGAB 40 requests, and the operation type is interpreted to determine the basic processing required. The operation request sub-device field is also interpreted to determine the destination for the request. For example:

A sub-device field value of 3,2,1,0 identifies the respective external memory engines 18 in the CLUE 18 as the target for the operation.

A sub-device field value of 4 indicates the CIF 22 local registers as the target for the operation.

If a sub-device field value of 5,6,7 is received, then an EXGM_BERR is returned to the requesting switching processor 200.

FIG. 3 illustrates a CIF 22 request write in which a four-cycle request such as a lookup for a 24-bit key. This transaction is controlled by the CIF_REQ_ENB_L signal, which validates the data cycles. The CLUE will assert CIF_REQ_SPACE_AVAIL if there is sufficient space in its receive FIFO. If two back-to-back requests were issued, the CIF_REQ_ENB_L signal can remain asserted and the data would appear as D1,D2,D3,D4,D1,D2,D3,D4 over eight cycles. Any number of consecutive back-to-back transfers can occur as long as the FIFO flags stay in a state that allows the transfer. All data and control signals are driven and latched on the rising clock edge.

The result state machine 80 converts result information from the CLUE 10 into the EXGAB 40 transaction format, and writes the fields to the EXGAB 70. The CLUE 10 result logic is the master of the CIF 22 result bus. The CIF 22 sends a cif_rslt_space_available signal indicating that a transfer can be initiated by the CLUE 10 result logic. The result state machine sits in the idle state until the CIF 20 input write line is active, indicating that data has arrived.

The result state machine 80 interprets the incoming operation type and starts building the appropriate GAB transaction in a register bank. The state machine determines when the valid end-of-transfer should occur and checks the incoming control field to verify the correct delineation. If an error occurs, then a bus error is sent to the original requesting master. This module also implements the loopback control logic. It multiplexes the result register bank and the loopback 55 to the output EXGAB 70. The result register bank write enable from the result state machine will always have highest priority if it generates a write cycle to the EXGAB 70 so that the result channel is never blocked by a loopback. This state machine runs off the clock domain in the switching processor 200 that is derived from the received cif_rslt_clk signal from the CLUE 10. The result information received from the CLUE 10 across the CIF 22 is processed by the CIF 22 result state machine 80.

There are two primary error conditions that the result state machine 80 can detect: bus parity errors and bus protocol errors. Parity error detection is performed based on the parity control fields set in the configuration register.

If the cif_prty_disable bit is set, then the received parity bit is never evaluated.

If the cif_prty_disable bit is not set, then parity error detection is enabled. In this mode, either even or odd parity is evaluated based on the setting of the cif_prty_even bit.

The parity error calculation operates on the received rslt_data (including the control field bits) and the rslt_prty signals. If a parity error is detected, then the result state machine 80 sets the cif_parity_err signal, which sets a status bit in the configuration register. This signal is also brought out of the CIF 22 and sent to the interface 12 block as an interrupt source bit. If the interrupt notification system is configured in the interface 12, the assertion of cif_parity_err results in an interrupt to the host system. The host system should respond by reading the CIF 22 configuration register and determining the source of the interrupt. The host system must clear the cif_parity_err bit in the register by writing a 1 to that bit location to toggle its current state. If a parity error occurs during the middle of a transfer, the result state machine 80 goes to a purge state to wait for a valid detection of an End Of Transfer. This is done as an attempt to re-synchronize the result state machine 80 to the next transfer.

The result state machine processes the incoming rslt_data[17:16] control fields to make sure that the proper operation transfer delineation occurs. It expects to see the first transfer accompanied by a Start of Transfer control field. The operation type is evaluated and the state machine sets a Data Transfer counter, which basically identifies the cycle in which the End Of Transfer control field is expected. If the control field does not match the expected value in any of these cases, the result state machine sets the cif_protocol_err signal, which sets a status bit in the configuration register. This signal is also brought out of the CIF 22 and sent to the interface 12 block as an interrupt source bit.

If the interrupt notification system is configured in the interface 12, the assertion of cif_protocol_err results in an interrupt to the host. The host should respond by reading the CIF 22 configuration register and determining the source of the interrupt. The host must clear the cif_protocol_err bit in the register by writing a 1 to that bit location to toggle its current state. If a protocol error occurs during the middle of a transfer, the request state machine goes to a purge state to wait for a valid detection of an End Of Transfer. This is done as an attempt to re-synchronize the machine to the next transfer.

Figure 5:
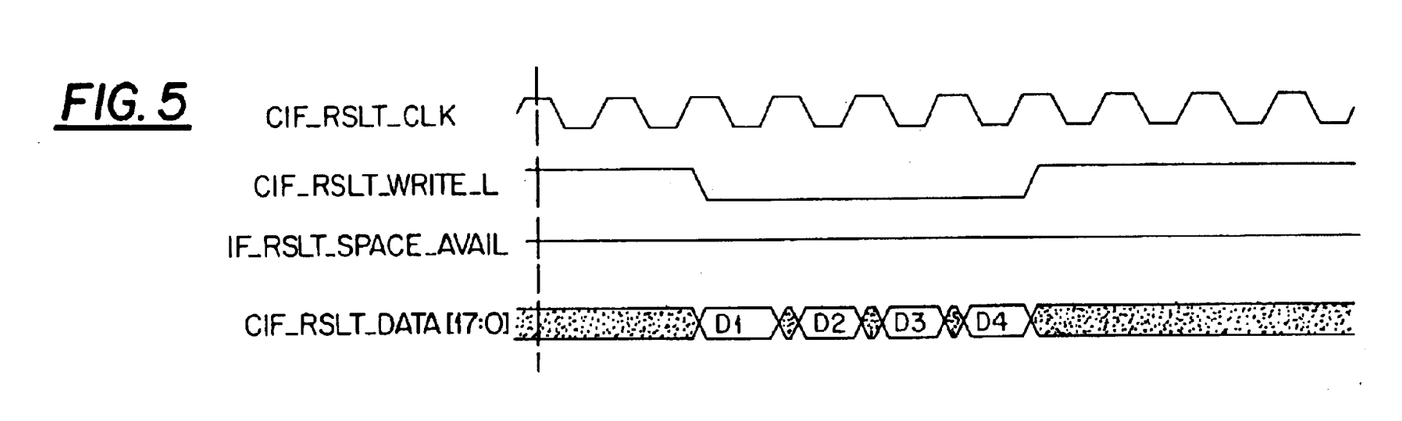

The CIF 22 result signal timing is identical to the CIF 22 request signal timing in that the CIF_RSLT_SPACE_AVAIL signal is dual-rank synchronized by the CLUE 10 result state machine. FIG. 5 illustrates a result returned from a 24-bit lookup using four data cycles.

The output signals to the CIF 22 Request Bus are registered at the output of the switching processor 200. This logic is broken into a separate module to facilitate special operations that are necessary to meet the critical timing of this interface. The CIF 22 is implemented utilizing a source synchronous clocking strategy. For the output stage, this means that the output register clock is sent with the data to the CLUE 10. There is an output delay element instantiated in the output clock path so that the physical layout team can easily find and tweak the delay value to try to match the clock delay to the data path delay.

The input signals from the CIF 22 Result Bus are immediately registered at the input to the switching processor 200. This logic is broken into a separate module to facilitate special operations that are necessary to meet the critical timing of this interface. The CIF 22 is implemented utilizing a source synchronous clocking strategy. The clock for the input register stage comes into the ASIC along with the data from the CLUE 10. The input registers are instantiated in this block. There are some delay elements instantiated in the data paths to serve as placeholders so that the physical layout team can easily find and tweak the delay values to try to match the data path delays to the clock insertion delay.

Figure 6:
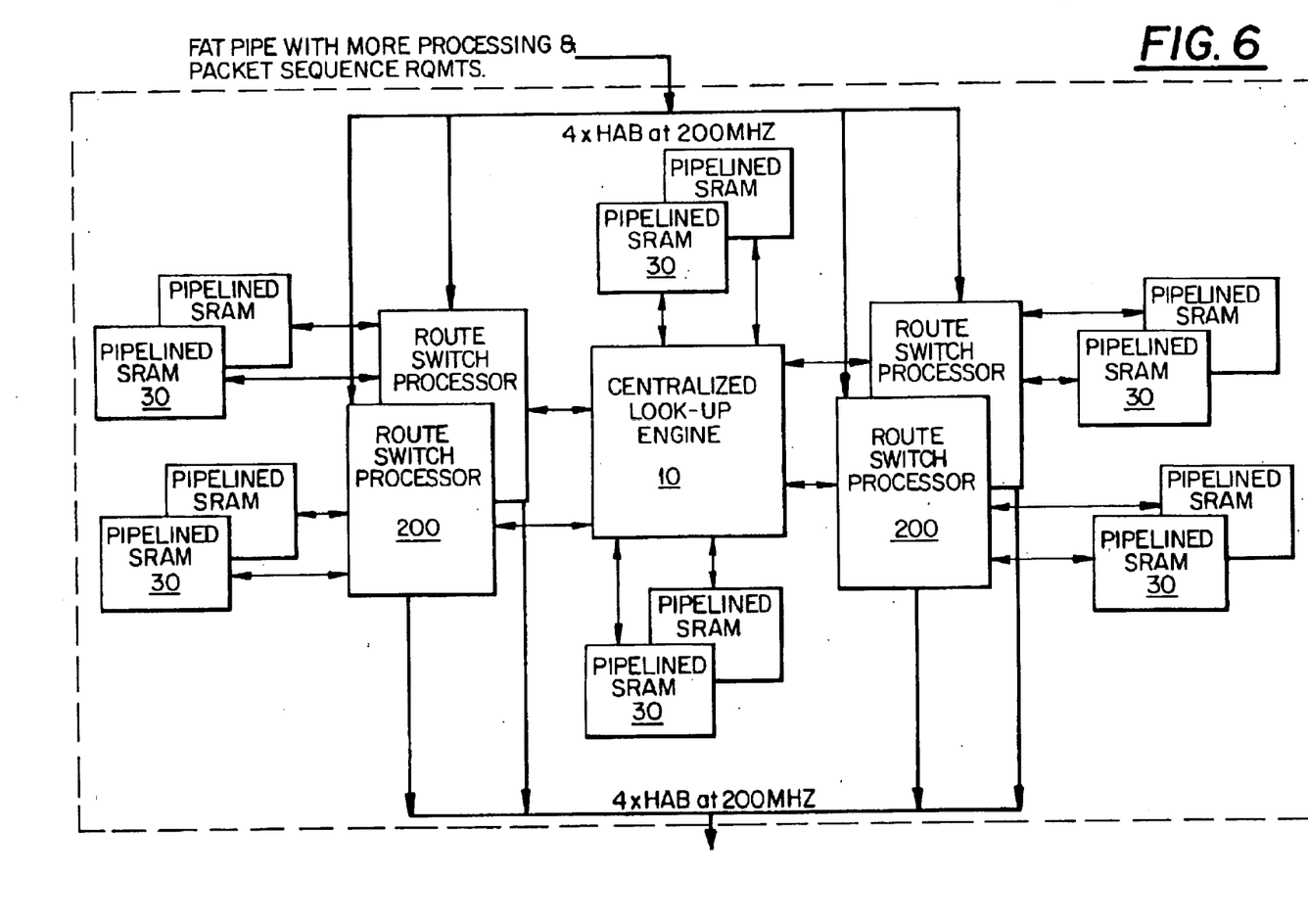
FIGS. 6 and 7 are blocks diagrams illustrating the versatile operability of the memory look up processor of the present invention.

FIG. 6 shows part of a CLUE 10 implementation using 4 switching processors 200 for additional processing power that still requires packet ordering to be maintained. An individual switching processor 200 is roughly capable of 16.5 MPPS when allowing 60 instructions per packet forwarding decision. If additional processing, filtering, policing, and so on is necessary, the number of instructions per packet forwarding decision may increase. If the increase is significant, more than one switching processor 200 may be needed to process the packets at line rate. The switching processor 200 provides a master sequence mechanism for tagging inputted packets, maintaining order and outputting the packets correctly. The switching processor 200 design assumes a "Fat Pipe Bus" type interface pushing and pulling packet data from all four switching processor 200s. The master sequence timing also assumes that consecutive SOP or EOP occur at least 5 cycles apart, which should correspond to 40 byte packets. This can be viewed as a parallel processing machine.

Figure 7:
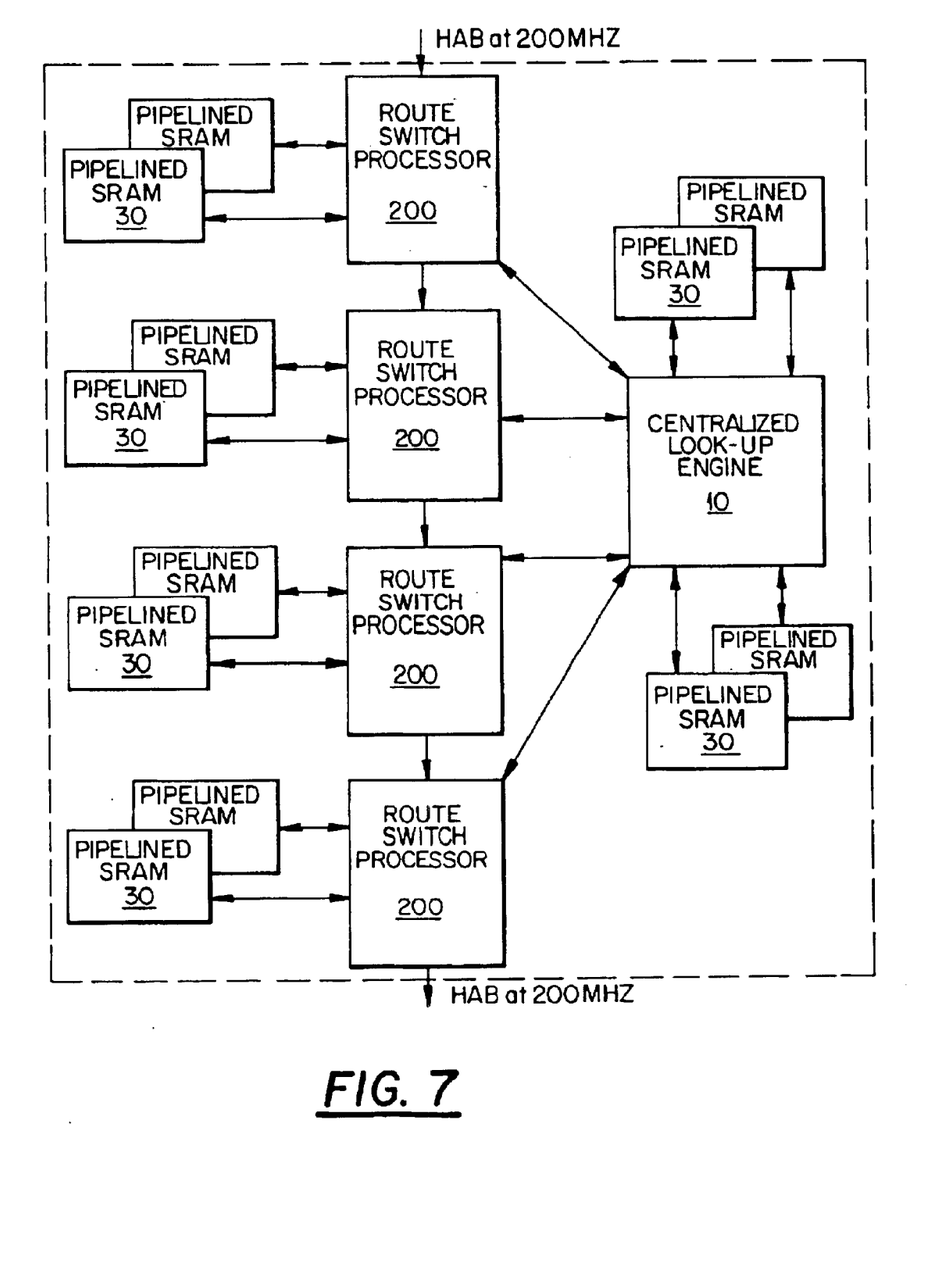

FIG. 7 shows part of a CLUE 10 implementation using 4 switching processors 200 for additional processing power that still requires packet ordering to be maintained but does not require the use of the switching processor 200 master sequencing. This application takes deeper thought into firmware partitioning, allocating firmware in steps to dedicated switching processor 200 ASICs and forwarding to the next switching processor 200 for the next processing step. Since the switching processor 200 input and output interfaces are both HAB interfaces, they can be connected in this pipelined fashion. This would only be limited by board real estate, power, and so on. The input rate would still be limited to 12.8 Gbits/s but the processing power would increase, since only a portion of the instructions would need to execute on a given switching processor 200. The 16.5 MPPS could be greatly exceeded. This pipelined mechanism fits nicely into a pipelined firmware flow diagram.

While the invention has been described by way of example embodiments, it is understood that the words which have been used herein are words of description, rather than words of limitation. Changes may be made, within the purview of the appended claims, without departing from the scope and spirit of the invention in its broader aspects. Although the invention has been described herein with reference to particular structures, materials and embodiments, it is understood that the invention is not limited to the particulars disclosed. The invention extends to all equivalent structures, mechanisms, acts, and uses, such as are within the scope of the appended claims.

What is claimed is:

1. A memory access device for storing and retrieving data packet information in a plurality of memory addresses, said memory access device comprising:

a first interface port for receiving control signals and address signals from a host information system;

a plurality of second interfaces, each said second interface coupled to a processor, said second interfaces receiving request for data signals from said processors;

a plurality of third interfaces, each said third interface having a plurality of memory address allocations, said third interfaces configured to access said memory address allocations;

a lookup controller coupled to said second interfaces and said third interfaces for receiving each said information request signal from said second interfaces, looking up the information at said third interfaces and returning the information to said second interfaces; and a timing source for synchronizing said first, second and third interfaces with said lookup controller;

wherein said first interface arbitrates which of said third interfaces said lookup controller accesses during each synchronizing timing cycle.

2. The memory access device of claim 1, wherein said timing source has a frequency cycle of at least 50 MHz.

3. The memory access device of claim 2, wherein said first interface includes a plurality of registers for storing said control and address signals.

4. The memory access device of claim 1, wherein each of said second interfaces includes a FIFO buffer for holding each of said information request signals, and subsequently submitting said information request signals to said lookup controller.

5. The memory access device of claim 1, wherein each one of said third interfaces comprises an external memory engine, each external memory engine coupled to a plurality of memory modules.

6. The memory access device of claim 5, wherein each one of said memory modules are synchronous static random access memory modules.

7. A bus for chip to chip memory access in a fast path routing system, said bus comprising:

a clock source, a loopback buffer, a request channel and a result channel;

said request channel includes a port for receiving a request signal from a processor device, request state machine for identifying the request, and a register for converting the request signal into a control signal and a data signal;

said result channel includes a register for receiving a data signal and a control signal and converting said control and data signals into a result signal, a result state machine for aligning the result signal with the request, and a port for transferring the result signal to the processor;

said clock source coupled to said request channel and said result channel for maintaining said request signals and said result signals in synchronization;

wherein said request signal having a data signal component and a control signal component; and wherein said loopback buffer receiving said data signal component and said control signal component from said request state machine, and said loopback buffer transferring said data signal component and said control signal component to said result state machine, such that the result state machine aligns said result signal with said data signal component and said control signal component of request signal for the processor.

8. The bus of claim 7, wherein said loopback buffer is a FIFO for sequentially storing said data signal components and said control signal components of said request signal.

9. The bus of claim 7, wherein said clock source has a frequency of at least 50 MHz.

10. The bus of claim 7, wherein said request signal further includes a request data signal component and a memory clock signal component.

* * * * *